US007085107B2

(12) United States Patent
Kanada et al.

(10) Patent No.: US 7,085,107 B2
(45) Date of Patent: Aug. 1, 2006

(54) INERTIAL LATCHING MECHANISM FOR DISK DRIVE ACTUATOR

(75) Inventors: Naoaki Kanada, Kanagawa (JP); Kohji Takahashi, Kanagawa (JP); Kazuyoshi Yoshida, Kanagawa (JP); Keiichiroh Yoshida, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 248 days.

(21) Appl. No.: 10/721,815

(22) Filed: Nov. 25, 2003

(65) Prior Publication Data

US 2004/0145832 A1    Jul. 29, 2004

(30) Foreign Application Priority Data

Nov. 29, 2002    (JP) ............... 2002-348625

(51) Int. Cl.
 *G11B 5/54*    (2006.01)

(52) U.S. Cl. .................................. 360/256.4

(58) Field of Classification Search ............. 360/256.4, 360/256
See application file for complete search history.

(56) References Cited

U.S. PATENT DOCUMENTS

| | | | | |
|---|---|---|---|---|
| 5,543,986 | A | * | 8/1996 | Albrecht ................. 360/256.4 |
| 5,870,256 | A | * | 2/1999 | Khanna et al. .......... 360/256.4 |
| 6,185,074 | B1 | * | 2/2001 | Wang et al. ............. 360/256.4 |
| 6,400,533 | B1 | * | 6/2002 | Liu et al. ................. 360/256.5 |
| 6,507,461 | B1 | * | 1/2003 | Kimura et al. .......... 360/256.4 |
| 6,728,075 | B1 | * | 4/2004 | Hong et al. ............. 360/256.4 |
| 6,735,053 | B1 | * | 5/2004 | Miyamoto et al. ...... 360/256.4 |
| 6,757,139 | B1 | * | 6/2004 | Miyamoto ............... 360/256.4 |
| 2002/0054456 | A1 | * | 5/2002 | Misso et al. ............ 360/256.4 |

* cited by examiner

*Primary Examiner*—Jefferson Evans
(74) *Attorney, Agent, or Firm*—Bracewell & Giuliani LLP

(57) ABSTRACT

The invention prevents the deterioration of the read/write performance of a hard disk drive due to the interference between an inertial latching mechanism and an actuator when a head slider holding a magnetic head is located at a read/write position. A latching arm 22 provided with a projection 23 and included in an inertial latching mechanism 20, and a part 161 of a coil holding arm 16*a* included in an actuator are formed in shapes such that the latching arm 22 provided with the projection 23 does not interfere with the coil holding arm 16*a* having the part 161 when a head slider mounted on the actuator is located at a read/write position on a magnetic disk.

5 Claims, 12 Drawing Sheets

(a)

(b)

INERTIAL LATCHING MECHANISM FOR DISK DRIVE ACTUATOR

RELATED PATENT APPLICATION

This application claims priority to Japanese Patent Application No. JP2002-348625 (Hitachi Global Storage Technologies Docket No. JP920020203US1), filed on Nov. 29, 2002, and entitled "Disk Drive."

BACKGROUND OF THE INVENTION

1. Technical Field

The present invention relates to a disk drive and, more particularly, to a disk drive provided with a latching mechanism for latching an actuator.

2. Description of the Related Art

A recent hard disk drive employs a head slider moving mechanism for moving a head slider supporting a magnetic head to prevent the head slider from sticking to the surface of a magnetic disk and to improve the reliability thereof in withstanding shocks applied thereto. The head slider moving mechanism holds an actuator on a part called a ramp disposed near the circumference of the magnetic disk to keep the head slider apart from the surface of the magnetic disk while the hard disk drive is not in operation.

FIG. 7 shows, by way of example, a hard disk drive 1 provided with a head slider moving mechanism. The hard disk drive 1 shown in FIG. 7 has a disk pack (case) 3 including a base 2 having the shape of a bottomed box, and a cover, not shown, for covering an open upper side of the base 2. A predetermined number of magnetic disks 4 are mounted in layers on a spindle motor, not shown, of in-hub construction so as to be rotatable. The magnetic disks 4 are rotated at a predetermined rotating speed by the spindle motor.

An actuator 10 is disposed in the disk pack 3. FIG. 8 is a plan view of the magnetic disk 4 and the actuator 10. Referring to FIGS. 7 and 8, the actuator 10 has a head support arm 12 supported by the middle part thereof on a pivot (shaft) 11 for rotation relative to the base 2. A head slider 14 holding a magnetic head 13 for reading recorded data from the magnetic disk 4 and writing data to the magnetic disk 4 is attached to a front end part of the head support arm 12. A voice coil 15 is held on a back end part of the head support arm 12. The voce coil 15 is disposed between a coil holding arms 16a and 16b that extend in a V-shape from a part around the pivot 11 of the head support arm 12 so as to diverge from each other.

A stator 17 is disposed on the base 2. The stator 17 creates a magnetic field in a space between the voice coil 15 held on the back end part of the actuator 10, and the stator 17. Thus, the voice coil 15 and the stator 17 constitute a voice coil motor (VCM) for turning the actuator 10. The VCM drives the actuator 10 for turning on the pivot 11 to move the magnetic head 13 attached to the front end part of the actuator 10 substantially along a radius of the magnetic disk 4 for a seek operation so that the magnetic head 13 can be located opposite to a desired track on the magnetic disk 4.

A ramp 18 is held on the base to hold the head slider 14 holding the magnetic head 13 apart from the magnetic disk 4 while the hard disk drive 1 is not in operation.

An inertial latching mechanism 20 is attached to the base 2. The inertial latching mechanism 20 latches the actuator 10 when an intense shock is applied to the hard disk drive 1 by an inertial force resulting from the shock acting on the hard disk drive 1. FIG. 9 is an enlarged view of the inertial latching mechanism 20 and the associated parts. As shown in FIGS. 8 and 9, the inertial latching mechanism 20 has a latching arm 22 having a middle part supported by a pivot (shaft) 21 on the base 2 (FIG. 7). The latching arm 22 is able to turn on the pivot 21. A projection 23 projects from the front end of the latch arm 22 into the base 2, i.e., into the paper. A pin 24 is attached to a back end part of the latching arm 22 so as to extend away from the bottom of the base 2, i.e., out of the paper. An inertial arm, not shown, is disposed near the pin 24. The inertial arm is turned by an external shock so as to push the pin 24.

When the hard disk drive 1 is not operating for reading data from or writing data to the magnetic disk 4, the VCM drives the actuator 10 to set the head slider 14 on the ramp 18. If a relatively small shock is applied to the hard disk drive 1 in this state, the ramp 18 restrains the head slider from movement so that the head slider 14 may not move toward the magnetic disk 4. If a relatively large shock is applied to the hard disk drive 1, the inertial arm, not shown, pushes the pin 24 to turn the latching arm 22 in the direction of the arrow α. Consequently, the projection 23 is engaged with the inner side, near the extremity of the coil holding arm 16a, of a part 161 to latch the actuator 10. The inertial latching mechanism 20 thus restrains the movement of the head slider 14 so that the head slider 14 may not move toward the magnetic disk 4.

In FIGS. 8 and 9, the actuator 10 holding the head slider 14 is restrained from movement by the inertial latching mechanism 20. In the normal state, the latching arm 22 of the inertial latching mechanism 20 is pulled in the direction of the arrow β by a spring, not shown, to keep the projection 23 disengaged from the coil holding arm 16a.

SUMMARY OF THE INVENTION

When the hard disk drive 1 operates for reading data from or writing data to the magnetic disk 4, the VCM drives the actuator 10 to place the head slider 14 resting on the ramp 18 on the magnetic disk 4 at a read/write position. When a relatively large shock acts on the hard disk drive 1 in such an operational state, the projection 23 of the inertial latching mechanism 20 abuts on the coil holding arm 16a as shown in FIGS. 10 and 11. Consequently, the actuator 10 is dislocated, the magnetic head 13 is unable to operate normally for a data reading or writing operation, and thereby the performance of the hard disk drive 1 is deteriorated.

Recent hard disk drives 1 are required to have an enhanced shock resistance because hard disk drives 1 are incorporated into potable devices other than personal computers (PCs), such as portable notebook-size personal computers, AV devices and on-vehicle devices in recent years. Recording density in which recent hard disk drives 1 record data has further been increased and the track pitch of magnetic disks 4 has been reduced accordingly. Therefore, the deterioration of the reading and writing performance of the hard disk drive 1 due to the operation of the inertial latching mechanism 20 while the actuator 10 holding the head slider 14 is in an operational state has become not negligible.

The present invention has been made to solve those technical problems and it is therefore an object of the present invention to prevent the deterioration of the reading and writing performance due to the interference between the latching mechanism and the moving member of the actuator while the head slider is in an operational state.

The aforesaid problem may be solved by cutting off a part, below line A–A' in FIG. 12, of the actuator 10 that will interfere with the inertial latching mechanism 20 when the magnetic head 13 mounted on the head slider 14 is in an operational state. However, if the part below the line A–A' is removed, the inertial latching mechanism 20 is unable to latch the actuator 10 when the actuator 10 is retracted to a home position.

The inventors of the present invention devised the shapes and positions of the actuator 10 and the inertial latching mechanism 20 to distinguish positions where the inertial latching mechanism 20 must engage (latch) the actuator 10 and positions where the inertial latching mechanism must not engage (must not touch) the actuator 10, and made the present invention.

According to a first aspect of the present invention, a disk drive comprises: a disk-shaped storage medium supported for rotation; a moving member supporting a read/write head for reading recorded data from the disk-shaped storage medium and writing data to the disk-shaped storage medium, and capable of moving the head between a read/write position where the head is able to read data from and write data to the disk-shaped storage medium and a home position where the head is separated from the disk-shaped storage medium; and a latching mechanism capable of securely holding the moving member in place when the head is located at the home position and of remaining separate from the moving member when the head is located at the read/write position.

In the disk drive, the latch mechanism may be an inertial latching mechanism that operates in response to an external shock. The moving member may be supported for turning about an axis of turning, may have one end supporting a head slider holding the head and the other end capable of being latched by the latching mechanism. The moving member may be held in place by the latching mechanism when the head slider is located at the home position, and may be formed in a shape such that the latching mechanism is unable to latch the moving member when the head slider is located at the read/write position. The latch mechanism may have a latching arm capable of moving in a predetermined allowable moving range in response to an external shock, the latching arm may be capable of latching the moving member in the allowable moving range when the head slider is located at the home position, and of remaining separate from the moving member in the allowable moving range when the head slide is located at the read/write position.

According to a second aspect of the present invention, a disk drive comprises: a disk-shaped storage medium supported for rotation; a head slider holding a read/write head capable of reading recorded data from the disk-shaped storage medium and of writing data to the disk-shaped storage medium; a moving member supporting the head slider, and capable of placing the head slider at a read/write position on the disk-shaped storage medium and of retracting the head slider from the read/write position on the disk-shaped storage medium; and a latch mechanism capable of latching the moving member in place when the head slider is retracted from read/write position on the disk-shaped storage medium and of remaining separate from the moving member when the head slider is located at the read/write position on the disk-shaped storage medium.

In the disk drive, the latching mechanism may be an inertial latching mechanism that operates in response to an external shock. The disk drive may further comprise a ramp for holding the retracted head slider, and the latching mechanism may latch the moving member in a state where the head slider is held by the ramp.

According to a third aspect of the present invention, a disk drive comprises: a disk-shaped storage medium supported for rotation; a read/write head capable of reading recorded data from the disk-shaped storage medium and of writing data to the disk-shaped storage medium; an arm supported for turning on a shaft, having a part extending on one side of the shaft and supporting the read/write head, and the other part extending on the other side of the shaft and provided with a driving mechanism to move the read/write head between a read/write position where the read/write head is able to read recorded data from and writing data to the disk-shaped storage medium, and a home position where the read/write head is separated from the disk-shaped storage medium; and a latching mechanism capable of securely latching the arm at the home position; wherein the arm is provided with a lever that is separated from the latching mechanism in a moving range of the latching mechanism when the read/write head is located at the read/write position.

In the disk drive, the latching mechanism may be an inertial latching mechanism that operates in response to an external shock. The latching mechanism may have a latching arm that moves in a predetermined allowable moving range in response to an external shock, and the latching arm may be capable of latching the lever in the allowable moving range when the head slider is located at the home position, and of remaining separate from the lever when the head slider is located at the read/write position. The lever may be formed in a shape such that the lever is outside an allowable moving range for the latching mechanism when the read/write head is located at the read/write position. The lever may have a recessed part for avoiding interference between the lever and the latching mechanism. The disk drive may further comprise a ramp for holding the head slider at the home position; wherein the latching mechanism latches the moving member in a sate where the head slider is held by the ramp.

DETAILED DESCRIPTION OF THE INVENTION

Figure 1:
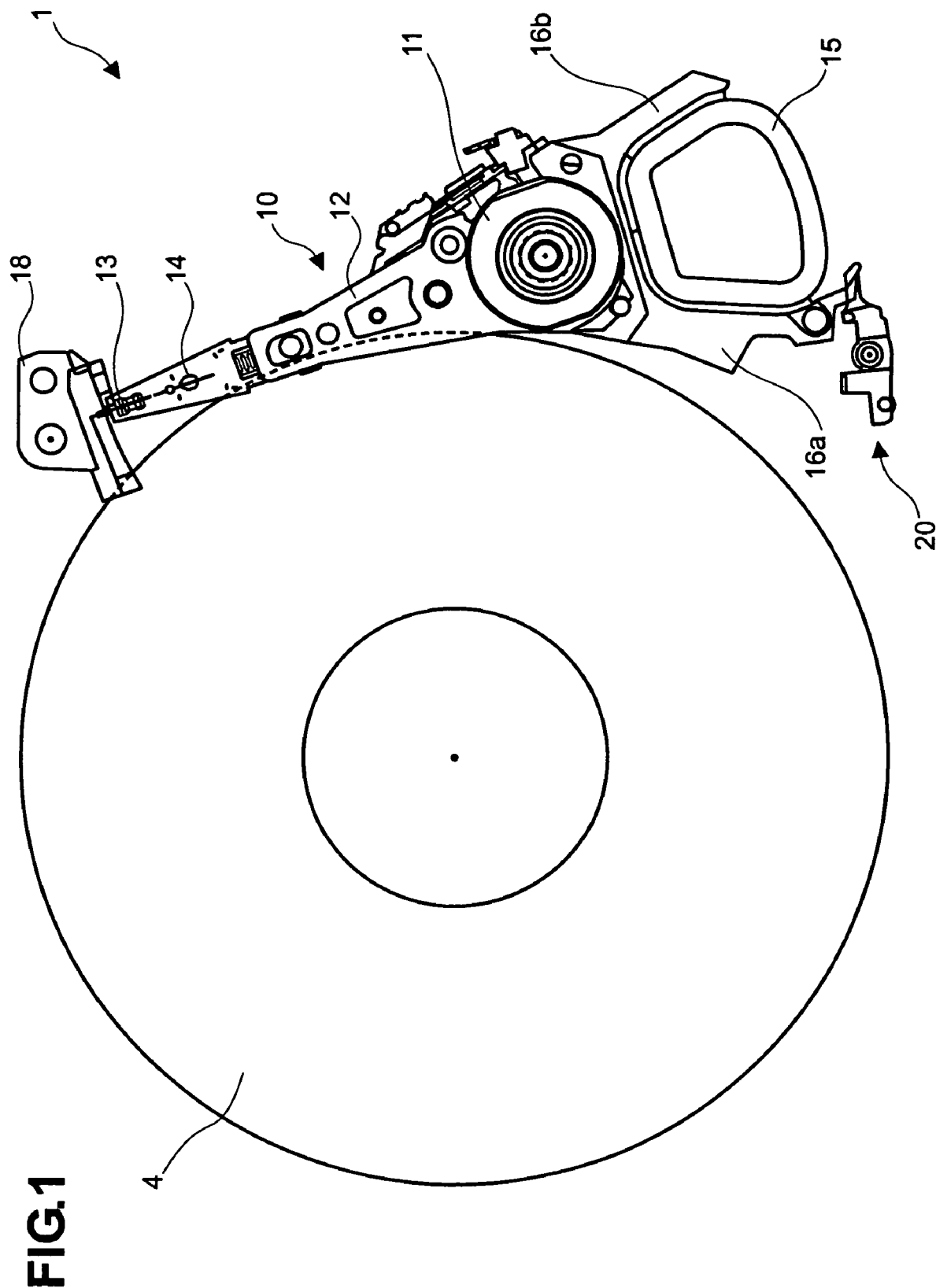
FIG. 1 is a view of assistance in explaining a hard disk drive in a preferred embodiment according to the present invention in a state where a head slider is set at a home position.
Figure 7:
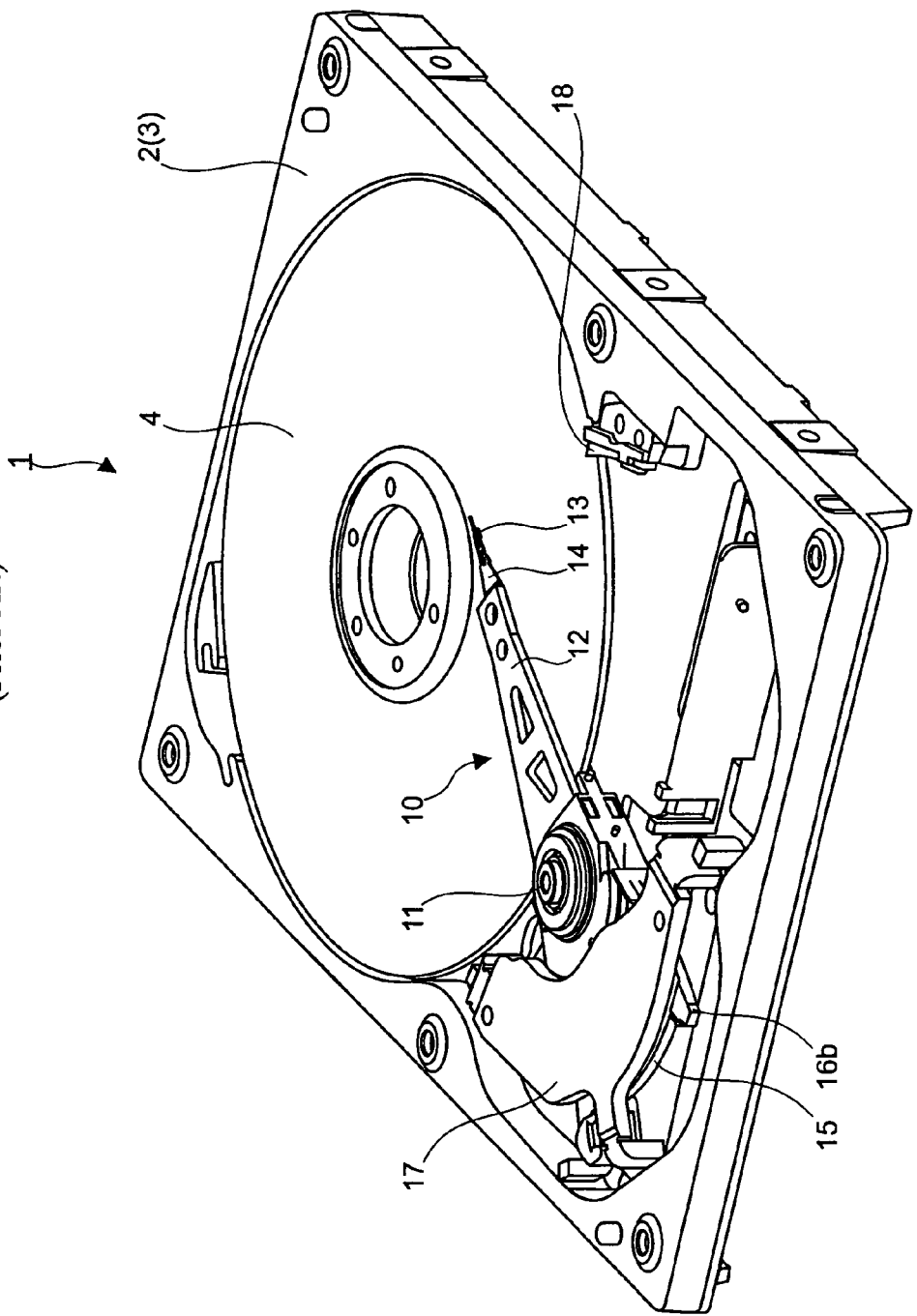
FIG. 7 is a view of assistance in explaining the construction of a hard disk drive.
Figure 8:
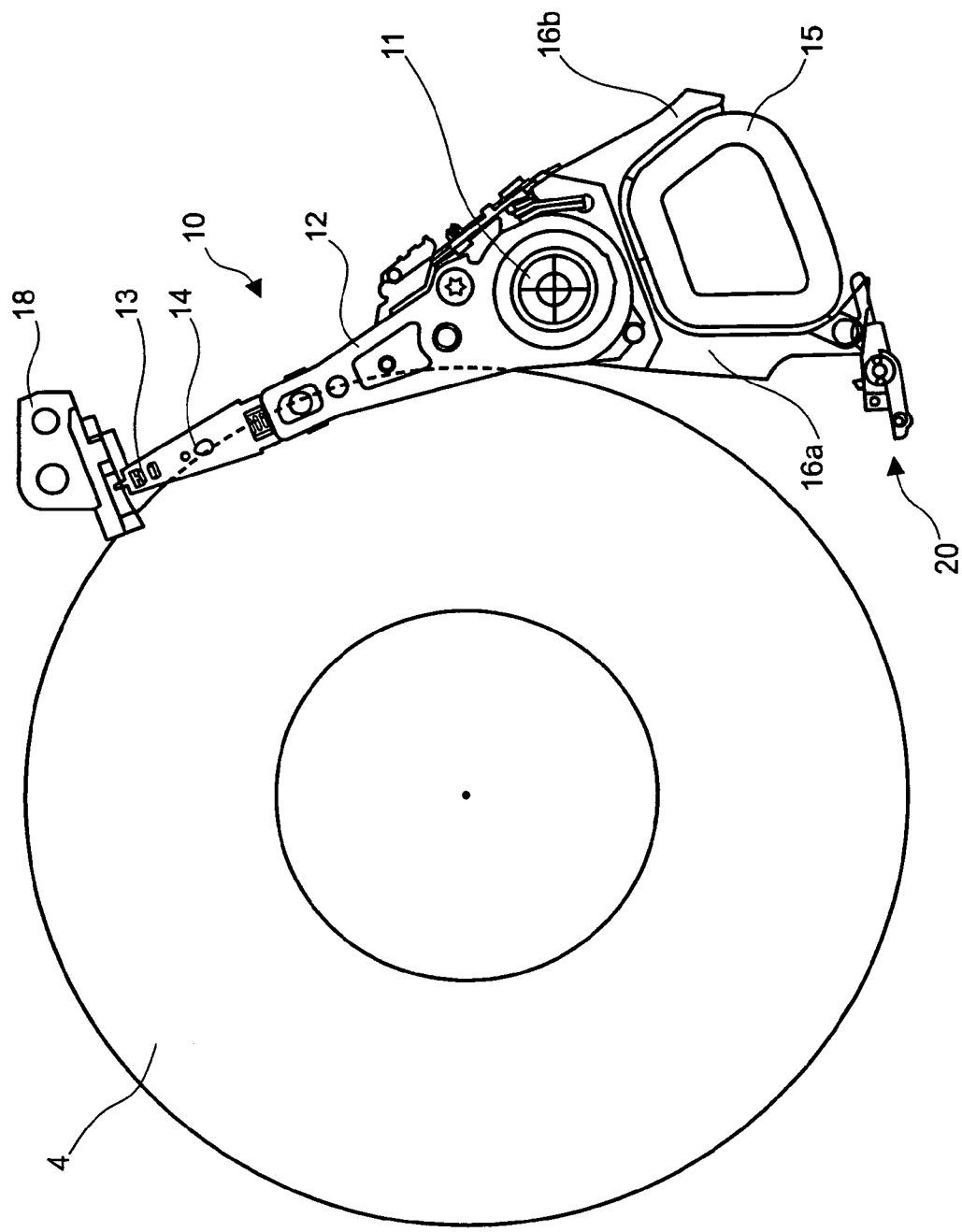
FIG. 8 is a view of assistance in explaining a conventional hard disk drive in an inoperative state.
Figure 9:
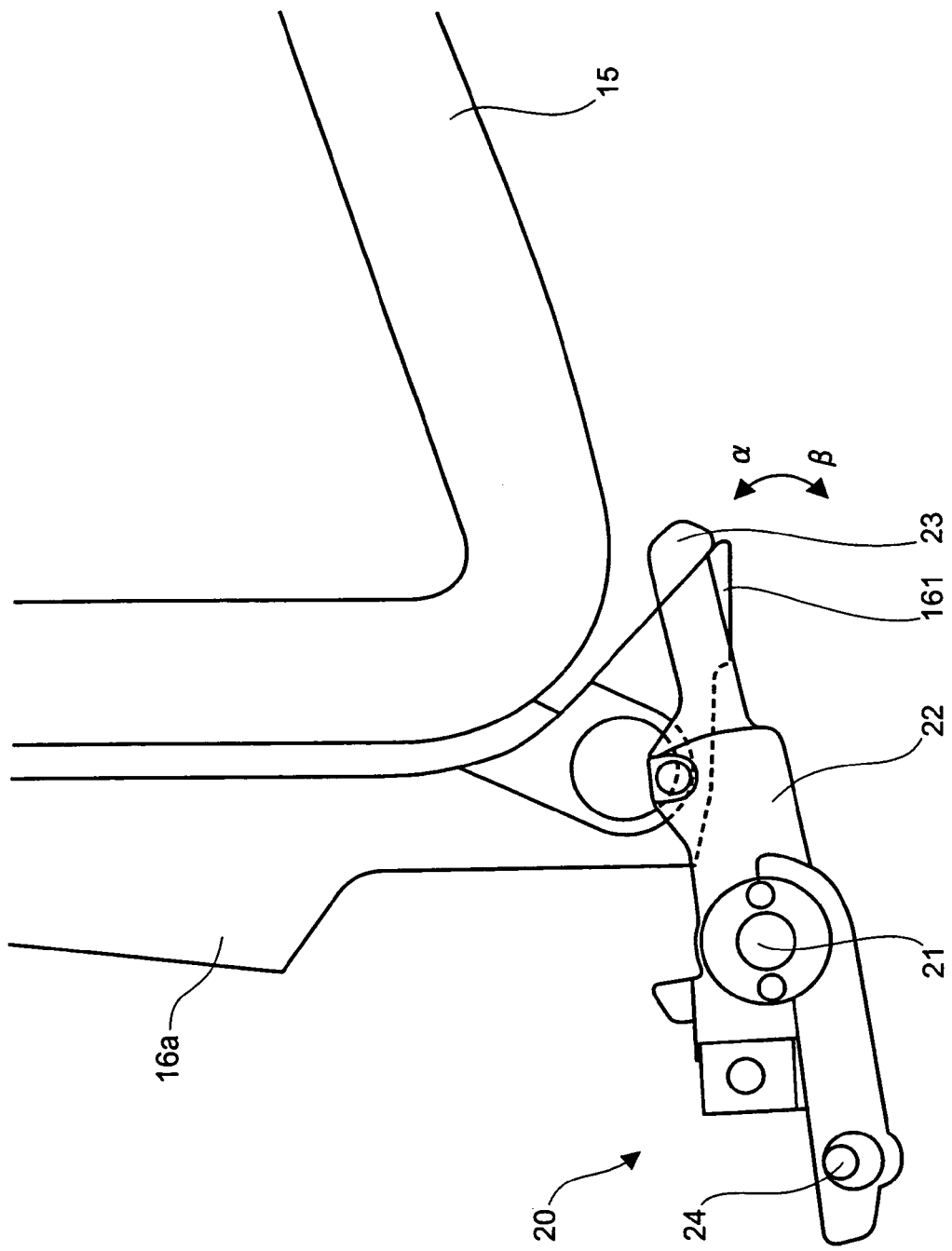
FIG. 9 is a view of assistance in explaining the operation of a conventional inertial latching mechanism in an inoperative state.
Figure 10:
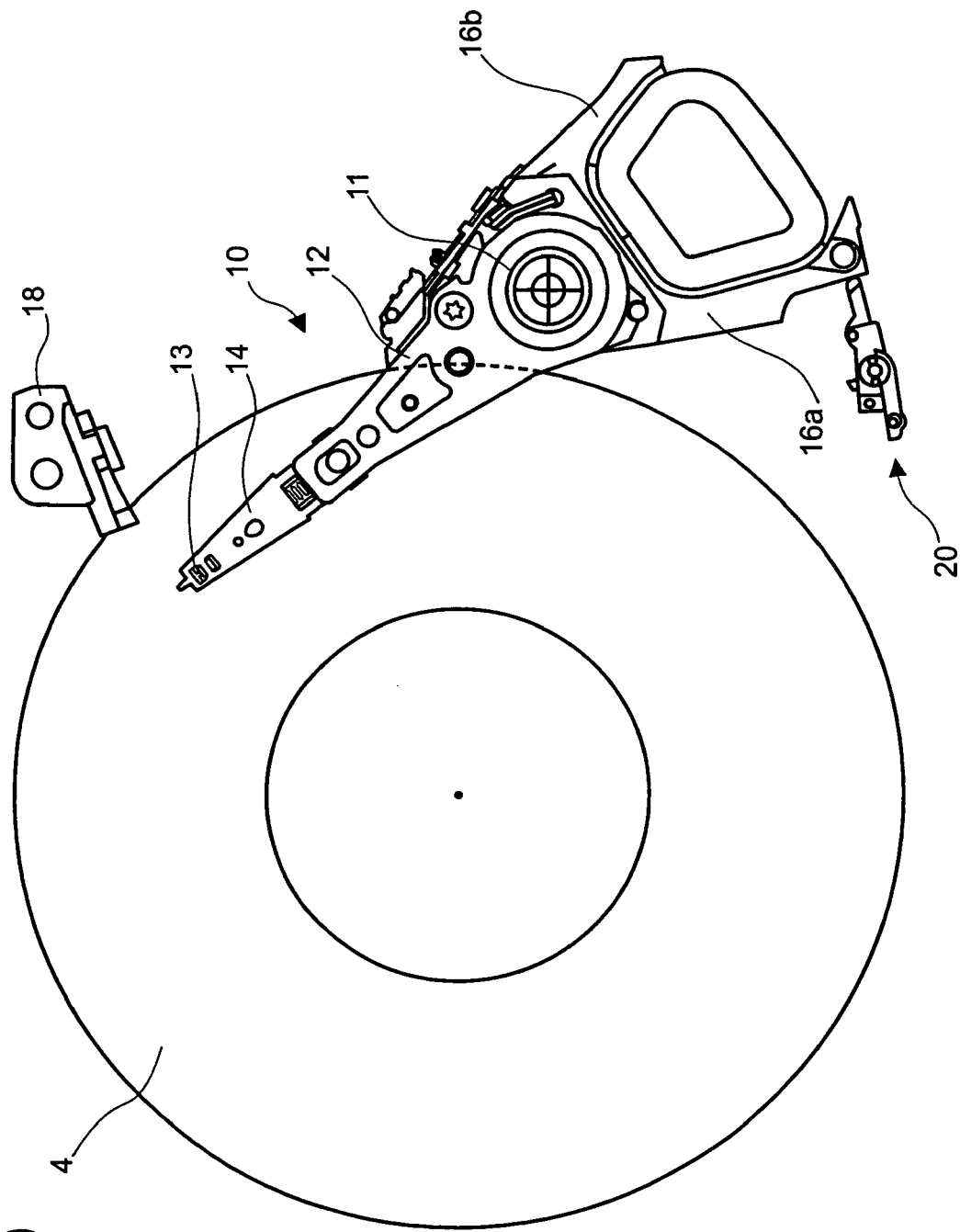
FIG. 10 is a top view of the conventional hard disk drive in an operative state.
Figure 11:
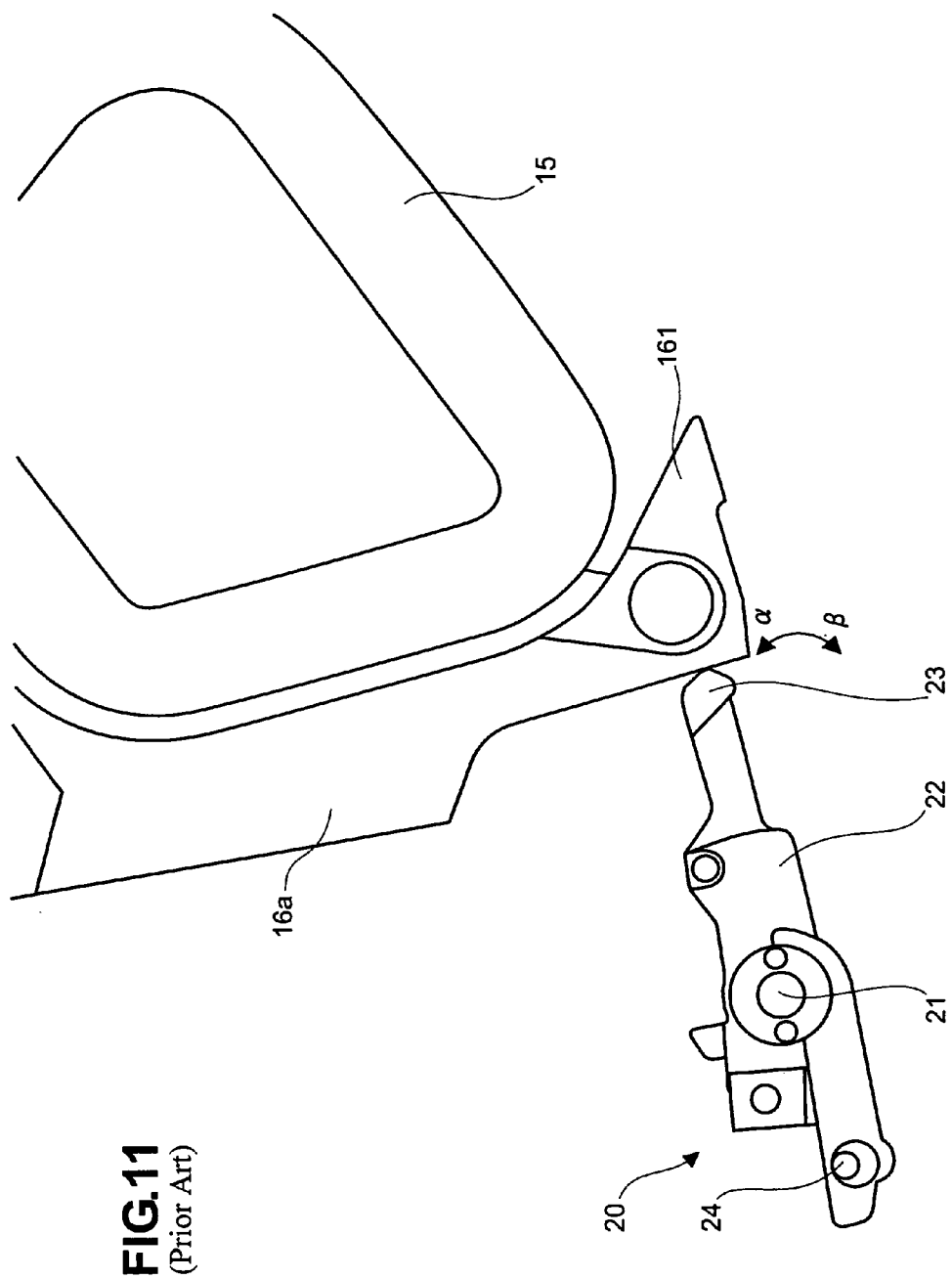
FIG. 11 is a view of assistance in explaining the operation of the conventional inertial latching mechanism in an operative state.
Figure 12:
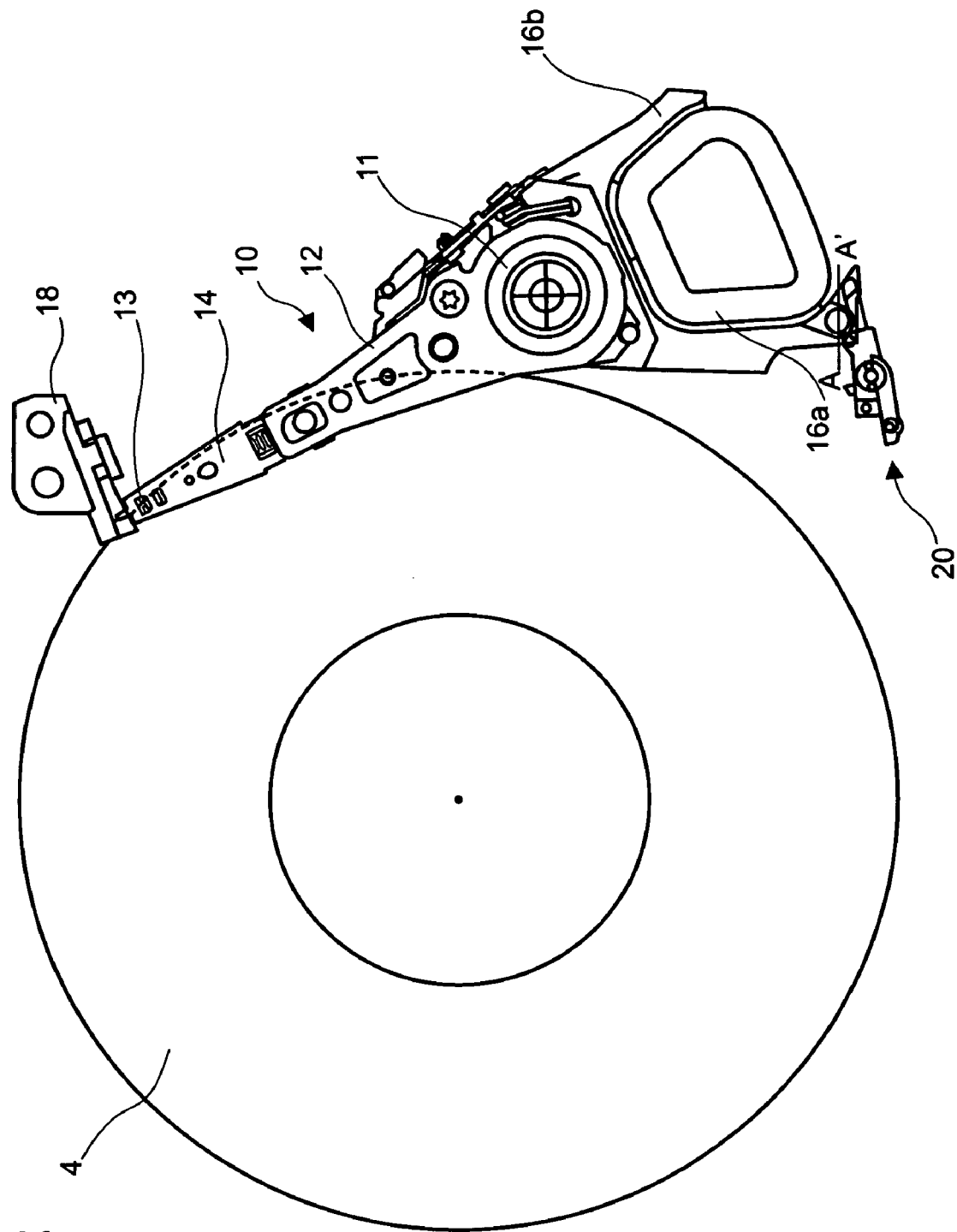
FIG. 12 is a view of assistance in explaining a process of making the present invention.

Embodiments of the present invention will be described with reference to the accompanying drawings. Hard disk drives embodying the present invention are the same in basic construction as the conventional hard disk drive shown in FIG. 7 and hence the description of the basic construction of the hard disk drives embodying the present invention will be omitted. FIG. 1 is a top view of a magnetic disk 4 and an actuator 10 (moving member, arm) included in a hard disk drive in a preferred embodiment according to the present invention. The actuator 10 is substantially the same in basic construction as the conventional actuator 10 shown in FIG. 8 and hence the parts thereof corresponding to those shown in FIG. 8 are denoted by the same reference characters and the description thereof will be omitted.

Figure 2:
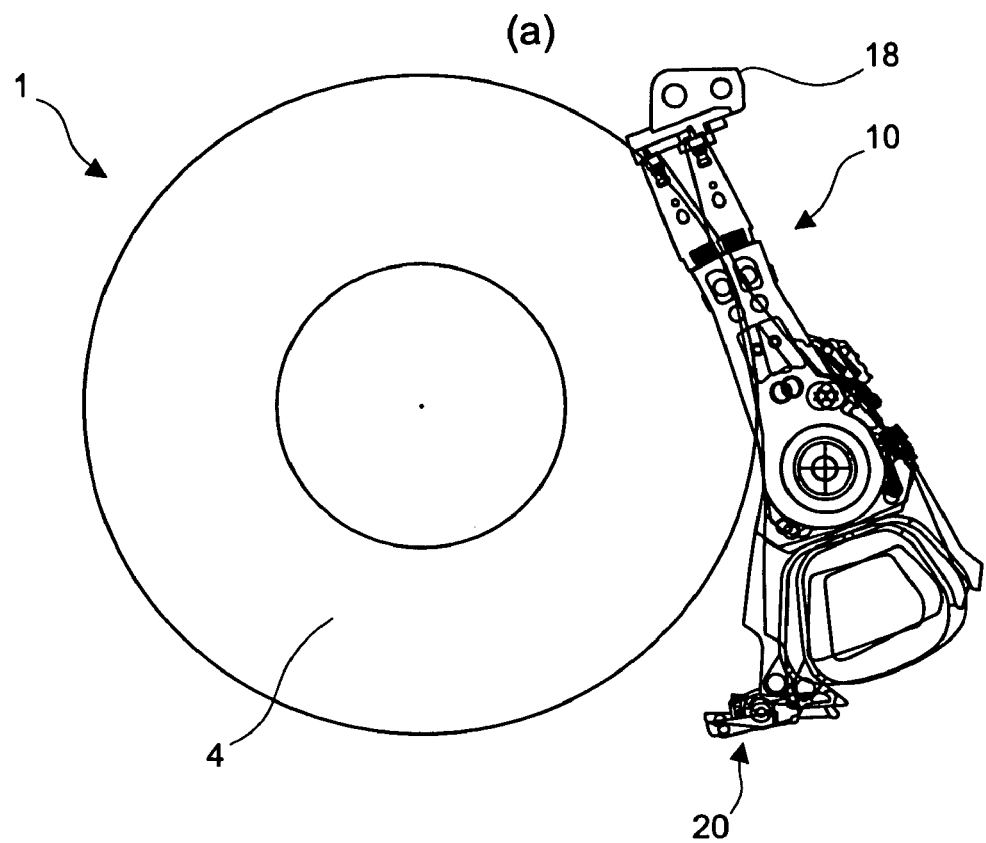
FIGS. 2(a) and 2(b) are view of assistance in comparatively explaining allowable moving ranges respectively for the hard disk drive of the present invention and a conventional hard disk drive.
Figure 2:
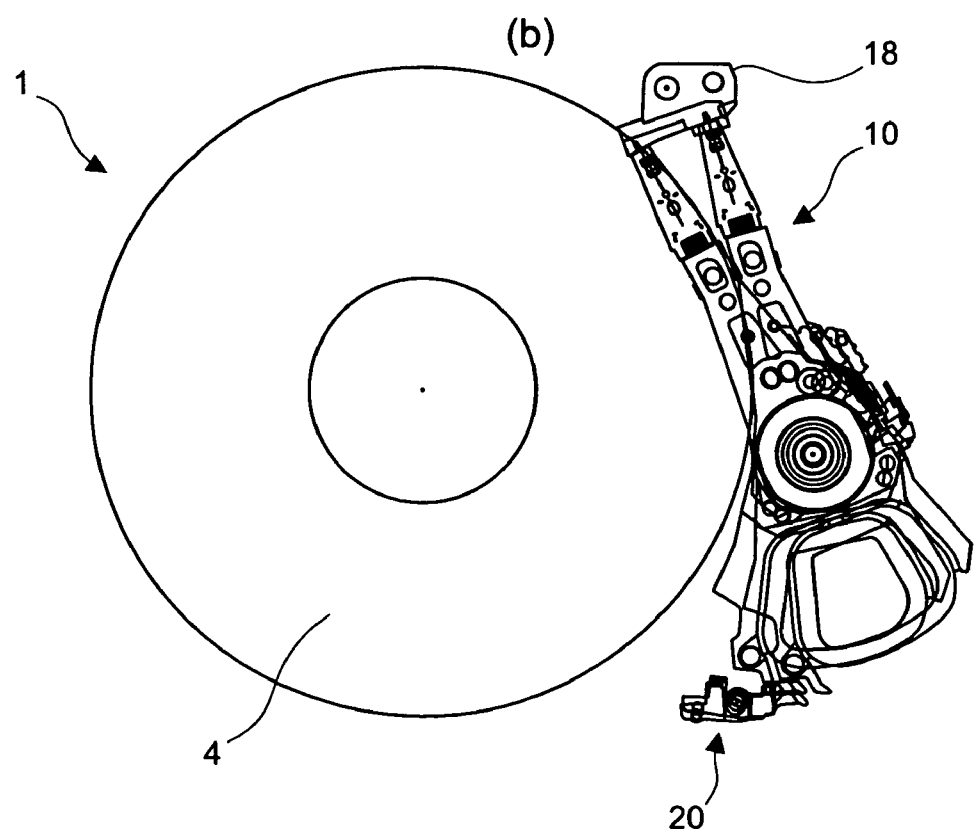

The actuator 10 included in the hard disk drive 1 in this embodiment is movable in a wide allowable moving range. More concretely, a home position to which a head slider 14 is retracted from a read/write position is apart from a magnetic disk 4. Thus, an allowable moving range for coil holding arms 16a and 16b projecting from a back end part of the actuator 10 is wider than that for the coil holding arms of the conventional hard disk drive. FIG. 2(a) shows the allowable moving range for the actuator 10 of the conventional hard disk drive 1 shown in FIG. 8, and FIG. 2(b) shows the allowable moving range for the actuator 10 of the hard disk drive 1 in the this embodiment. It is will readily be understood from FIGS. 2(a) and 2(b) that the allowable moving range for the actuator 10 of the hard disk drive 1 in the fist embodiment is wider than that for the actuator 10 of the conventional hard disk drive 1.

Figure 3:
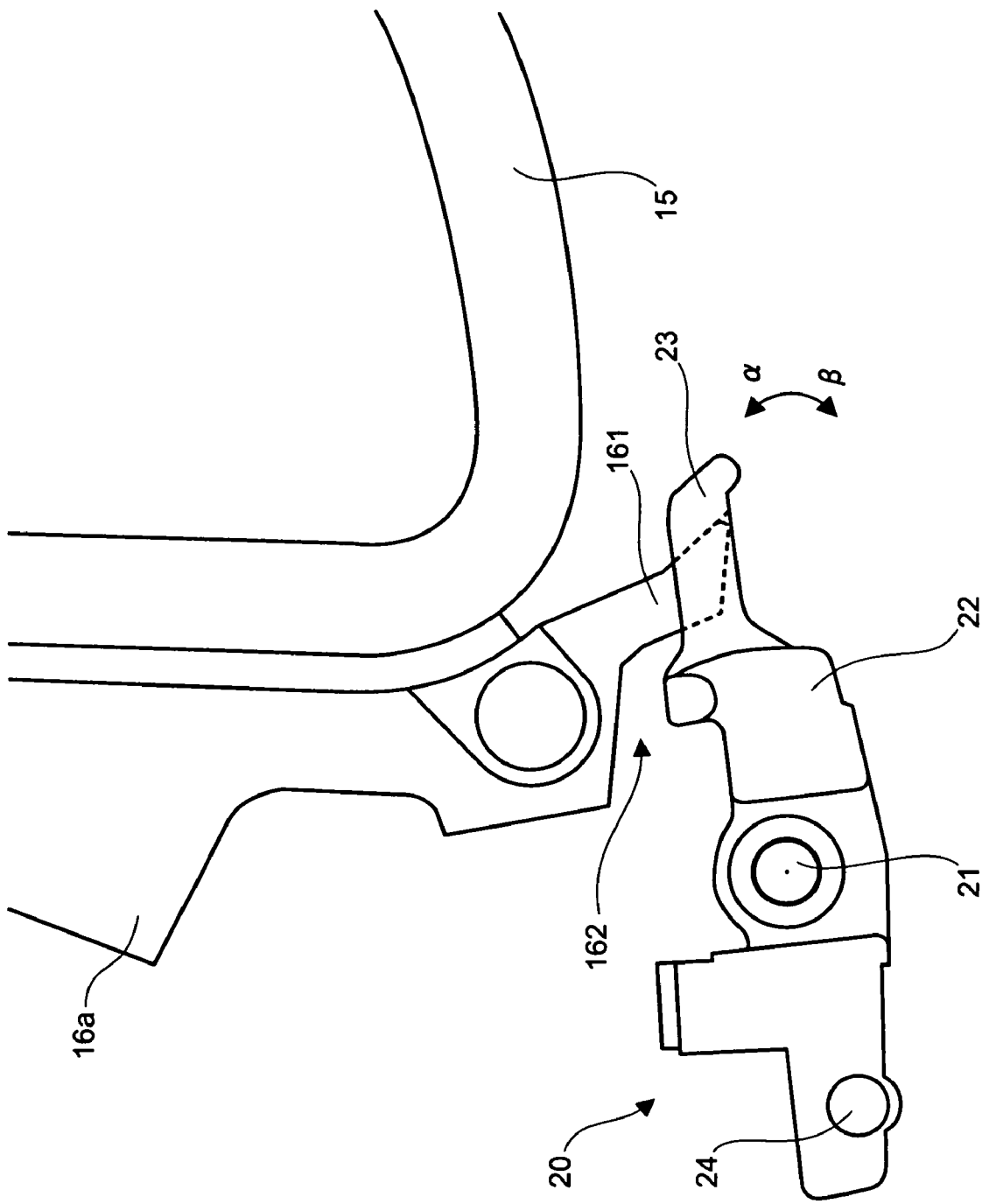
FIG. 3 is a view of assistance in explaining the operation of an inertial latching mechanism included in the hard disk drive embodying the present invention in a state where the head slider is set at a home position.

FIG. 3 is an enlarged view of an inertial latching mechanism 20 and the associated parts. The inertial latching mechanism 20 has a latching arm 22 supported by the middle part thereof on a base 2 by a pivot 21. The allowable moving range for the latching arm 22 is the same as that for the latching arm of the conventional hard disk drive shown in FIG. 8. A projection 23 projects downward (into the paper as viewed in FIG. 3) from a front end part of the latching arm 22. A pin 24 is set in a back end part of the latching arm 22 so as to extend upward (out of the paper as viewed in FIG. 3). An inertial arm, not shown, that is caused to turn by an external shock to push the pin 24 is disposed near the pin 24.

A coil holding arm 16a projecting from the actuator 10 has a part 161 thinner than that of the conventional hard disk drive, and hence a recess 162 is formed in the part 161.

In the hard disk drive 1 in the this embodiment, a VCM drives the actuator 10 so that the head slider 14 is set on a ramp 18 when the hard disk drive 1 is not in a read/write operation. If a relatively small shock is applied to the hard disk drive 1 in this state, the ramp 18 restrains the head slider 14 from movement so that the head slider 14 may not move toward the magnetic disk 4. If a relatively large shock is applied to the hard disk drive 1, the inertial arm, not shown, pushes the pin 24 to turn the latching arm 22 in the direction of the arrow α. Consequently, the projection 23 is engaged with the inner side of the part 161 of the coil holding arm 16a to latch the actuator 10. In this state, the head slider 14 remains held on the ramp 18. Thus, the coil holding arm 16a serves as a lever for controlling the movement of the actuator 10. Since the part 161 of the coil holding arm 16a has a narrow, elongate shape and has the recess 162, any part other than the part 161 of the coil holding arm 16a does not overlap the latching arm 22 of the inertial latching mechanism 20 when the projection 23 of the inertial latching mechanism 20 is engaged with the part 161 of the coil holding arm 16a.

In FIGS. 1 and 3, the actuator 10 holding the head slider 14 is restrained from movement by the inertial latching mechanism 20. Normally, the latching arm 22 of the latching mechanism 20 is urged in the direction of the arrow β by a spring or such so that the projection 23 can be separated from the coil holding arm 16a.

Figure 4:
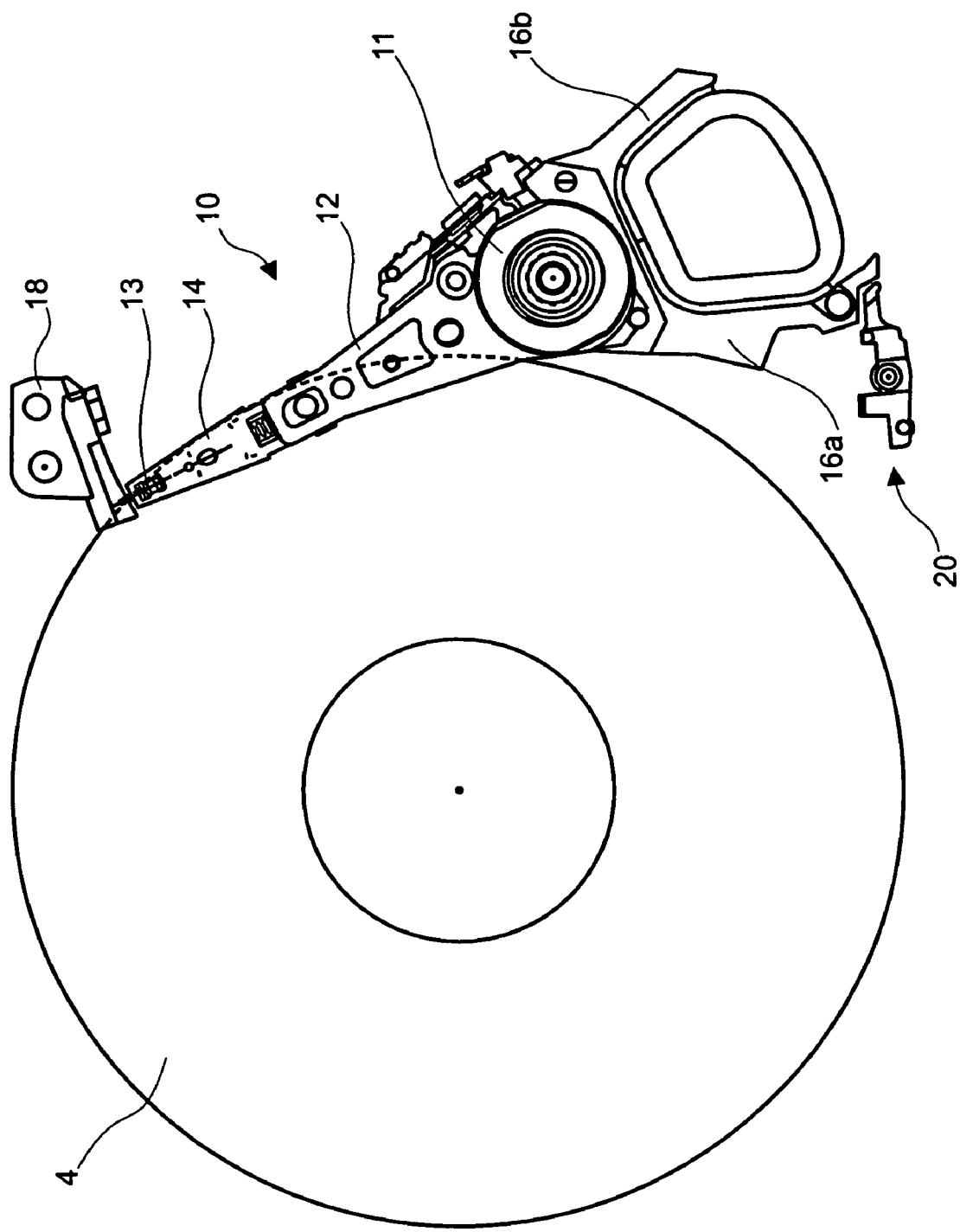
FIG. 4 is a view of assistance in explaining the inertial latching mechanism included in the hard disk drive in the preferred embodiment in a state where the head slider is set at a read/write position.
Figure 5:
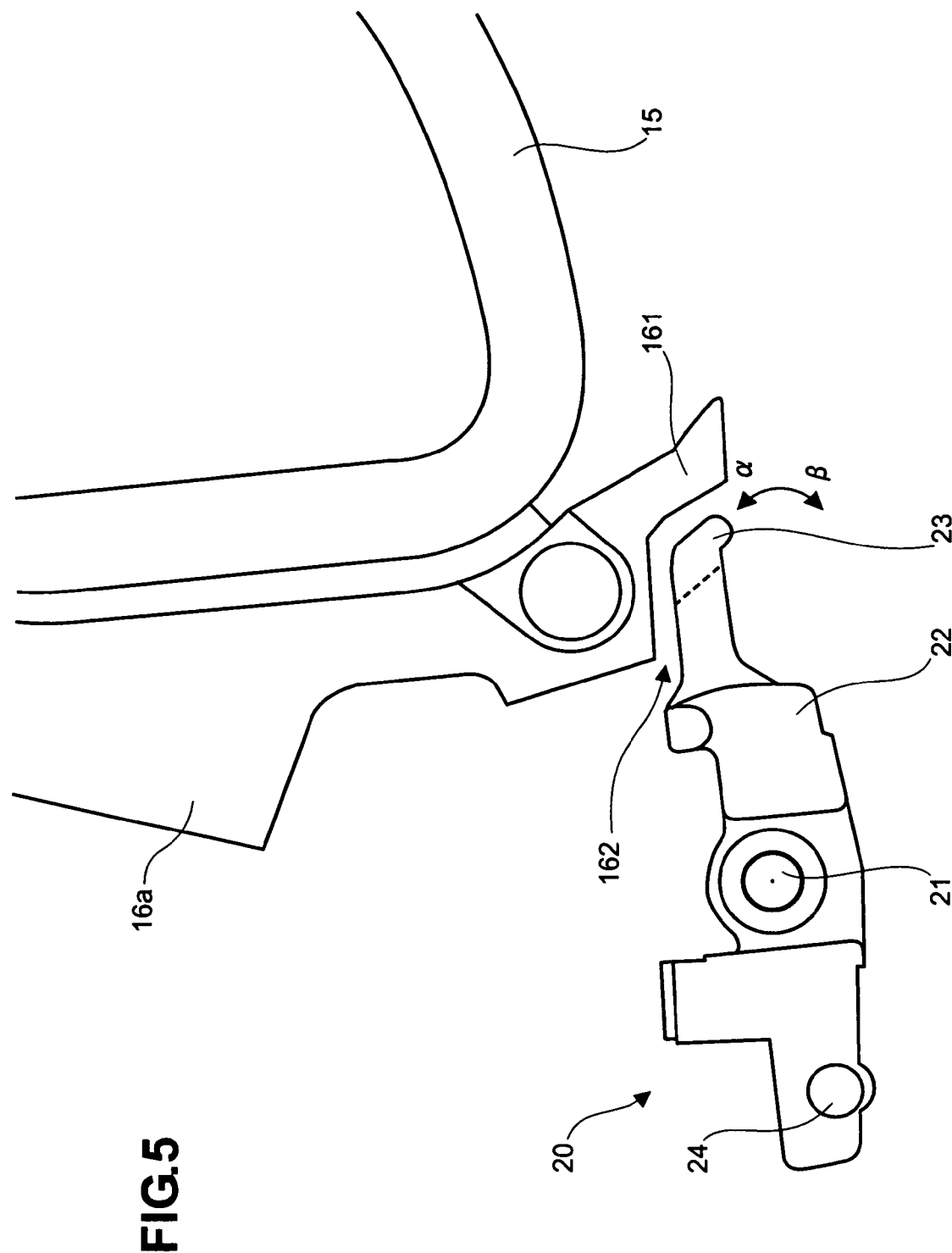
FIG. 5 is a view of assistance in explaining the inertial latching mechanism included in the hard disk drive embodying the present invention in a state where the head slider is located at a read/write position.
Figure 6:
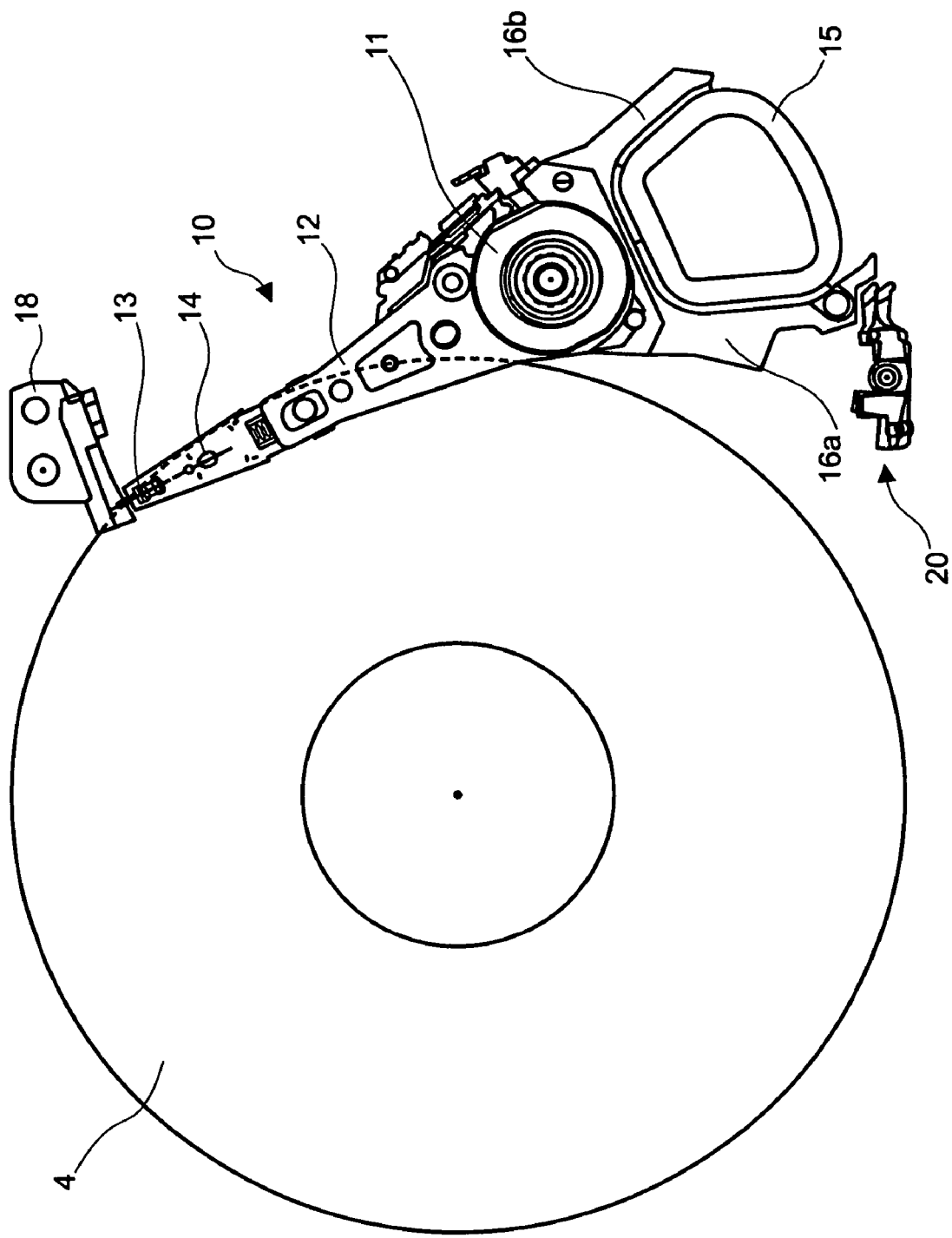
FIG. 6 is a view of assistance in explaining an allowable moving range for an arm included in the inertial latching mechanism in a state where the head slider is located at a read/write position on the magnetic disk.

When the hard disk drive 1 is in the read/write operation, the VCM drives the actuator 10 to move the head slider 14 from the ramp 18 to a position on the magnetic disk 4. If a relatively large shock is applied to the hard disk drive 1 in a state for the read/write operation, the shock causes the inertial arm, not shown, to push the pin 24 and thereby the latching arm 22 is turned in the direction of the arrow α. FIG. 4 shows the positional relation between the magnetic disk 4 and the actuator 10 and FIG. 5 is an enlarged view of the inertial latching mechanism 20 and the associated part in such a state. FIG. 6 shows an allowable angular range for the latching arm 22 of the inertial latching mechanism 20 when the head slider 14 is on the magnetic disk.

As apparent from FIGS. 4 to 6, the projection 23 of the latching arm 22 does not interfere with the part 161 of the coil holding arm 16a even if the inertial latching mechanism 20 operates in a state where the head slider 14 is located on the magnetic disk 4; that is, the coil holding arm 16a of the actuator 10 does not touch the latching arm 22 even if the latching arm 22 is turned in the direction of the arrow α to a limit of the allowable angular range when the head slider 14 is located at a read/write position. Therefore, the latching arm 22 is unable to exert a force on the actuator 10 and hence the movement of the magnetic head 13 mounted on the head slider 14 is not obstructed. Thus, the part 161 (lever) of the coil holding arm 16a does not touch the inertial latching mechanism 20 in the moving range of the inertial latching mechanism 20 while the magnetic head 13 is on the magnetic disk 4.

Thus, in this embodiment, the deterioration of the data read/write performance can be prevented even if the inertial latching mechanism 20 operates while the head slider 14 is on the magnetic disk 4.

In principle, the head slider 14 is on the magnetic disk 4 when the magnetic disk drive 1 is in a read/write state. A state where the head slider 14 is on a peripheral part not storing any data of the magnetic disk 4 is an inoperative state even if the head slider 14 is on the magnetic disk 4.

As apparent from the foregoing description, according to the present invention, the deterioration of the read/write performance due to the interference of the latching mechanism with the actuator can be prevented in a state where the head slider holding the head is set in a read/write state.

What is claimed is:

1. A disk drive, comprising:

a disk-shaped storage medium supported for rotation;

a head slider holding a read/write head for reading recorded data from the disk-shaped storage medium and writing data to the disk-shaped storage medium;

a moving member supporting the head slider and placing the head slider at a read/write position on the disk-shaped storage medium, and retracting the head slider from the read/write position on the disk-shaped storage medium, the moving member having a pair of coil holding arms with a voice coil mounted therebetween, and a shape that extends from only one of said pair of coil holding arms;

only one latching mechanism capable for latching the moving member in place when the head slider is retracted from a read/write position on the disk-shaped storage medium to a home position, and remaining separate from the moving member when the head slider is located at the read/write position on the disk-shaped storage medium;

a ramp for holding the retracted head slider, wherein the only one latching mechanism latches the moving member in a state where the head slider is held by the ramp, and the latching mechanism being unable to latch the moving member when the head is located at the read/write position; and wherein the only one latching mechanism is an inertial latching mechanism that operates in response to an external shock, the moving member having a shape that contacts the latching mechanism and the shape is narrow and elongate and has a recess formed therein.

2. A disk drive, comprising:

a disk-shaped storage medium supported for rotation;

a read/write head for reading recorded data from the disk-shaped storage medium and writing data to the disk-shaped storage medium;

an arm supported for turning on a shaft, having a part extending on one side of the shaft and supporting the read/write head, and another part extending on another side of the shaft and having a driving mechanism to move the read/write head between a read/write position where the read/write head reads recorded data from and writes data to the disk-shaped storage medium, and a home position where the read/write bead is separated from the disk-shaped storage medium;

a latching mechanism capable of securely latching the arm at the home position, the latching mechanism comprising only one inertial latching mechanism that operates in response to an external shock; wherein the arm has a lever that is separated from the latching mechanism in a moving range of the latching mechanism when the read/write head is located at the read/write position; and wherein the lever is narrow and elongate and has a recessed part for avoiding interference between the lever and the latching mechanism.

3. The disk drive of claim 2, wherein the latching mechanism has a latching arm that moves in a predetermined allowable moving range in response to an external shock, and the latching arm latches the lever in the allowable moving range when the head slider is located at the home position, and remains separate from the lever when the head slider is located at the read/write position such that the latching mechanism is unable to latch the arm when the read/write head is located at the read/write position.

4. The disk drive of claim 2, wherein the lever is formed in a shape such that the lever is outside an allowable moving range for the latching mechanism when the read/write head is located at the read/write position, and the arm comprises a pair of coil holding arms with a voice coil mounted therebetween, and the lever extends from only one of said pair of coil holding arms.

5. The disk drive of claim 2, further comprising a ramp for holding the head slider at the home position, wherein the latching mechanism latches the moving member in a state where the head slider is held by the ramp.

* * * * *